(12) United States Patent
Hurwitz et al.

(10) Patent No.: US 7,894,464 B2
(45) Date of Patent: *Feb. 22, 2011

(54) APPARATUS AND METHOD FOR AUTO-NEGOTIATION IN A COMMUNICATION SYSTEM

(75) Inventors: Walter Hurwitz, San Jose, CA (US); Richard Thousand, Ankeny, IA (US); Kevin Brown, Long Beach, CA (US); Gary Huff, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/457,093

(22) Filed: Jun. 1, 2009

(65) Prior Publication Data

US 2009/0245274 A1 Oct. 1, 2009

Related U.S. Application Data

(63) Continuation of application No. 11/003,739, filed on Dec. 6, 2004, now Pat. No. 7,558,280.

(60) Provisional application No. 60/528,476, filed on Dec. 11, 2003.

(51) Int. Cl.
*H04L 12/28* (2006.01)
(52) U.S. Cl. ..................................................... 370/419
(58) Field of Classification Search ................. 370/419, 370/420, 463, 465; 709/237, 249, 250
See application file for complete search history.

(56) References Cited

U.S. PATENT DOCUMENTS

| | | | |
|---|---|---|---|
| 5,594,734 A | 1/1997 | Worsley et al. | |
| 5,724,086 A | 3/1998 | Mackin et al. | |
| 5,754,552 A | 5/1998 | Allmond et al. | |
| 5,907,553 A | 5/1999 | Kelly et al. | |
| 6,081,854 A | 6/2000 | Priem et al. | |
| 6,094,439 A | 7/2000 | Krishna et al. | |
| 6,115,389 A | 9/2000 | Mahale et al. | |
| 6,272,552 B1 | 8/2001 | Melvin et al. | |
| 6,484,213 B1 | 11/2002 | Nouri | |
| 6,556,589 B2 | 4/2003 | McRobert et al. | |
| 6,794,577 B1 | 9/2004 | Bhogal | |
| 6,795,450 B1 | 9/2004 | Mills et al. | |

(Continued)

OTHER PUBLICATIONS

IEEE, "IEEE Standard For High Performance Serial Bus—Amendment," IEEE, p1394c-200x, Draft 0.1, Nov. 16, 2003, pp. 1-118.

(Continued)

*Primary Examiner*—Dmitry H Levitan
(74) *Attorney, Agent, or Firm*—Sterne, Kessler, Goldstein & Fox P.L.L.C.

(57) ABSTRACT

A communication system includes a first device and a second device that can advertise multiple capabilities using communication links. A first type of auto-negotiation between the first and second devices is performed using a first communication link between the devices. A second communication link between the devices is used to facilitate a second type of auto-negotiation. For example, the first communication link can include pairs A and B of an IEEE Std. 802.3 four twisted pair cable. The second communication link can include pairs C and D of the cable.

23 Claims, 7 Drawing Sheets

300

| Priority | Technology |
|---|---|
| 1 | IEEE Std. 802.3 |
| 2 | IEEE Std. 802.5 |
| 3 | IEEE Std. 802.9 |
| 4 | IEEE Std. 1394 |

U.S. PATENT DOCUMENTS

| | | | |
|---|---|---|---|
| 6,813,561 B2 | 11/2004 | MacNeille et al. | |
| 7,165,121 B2 | 1/2007 | Richman | |
| 7,180,908 B2 * | 2/2007 | Valavi et al. | 370/465 |
| 2002/0019954 A1 | 2/2002 | Tran | |
| 2002/0031120 A1 | 3/2002 | Rakib | |
| 2002/0046267 A1 | 4/2002 | Andra et al. | |
| 2002/0154640 A1 | 10/2002 | Wei | |
| 2003/0065863 A1 | 4/2003 | Wyland | |
| 2003/0165142 A1 | 9/2003 | Mills et al. | |
| 2004/0039866 A1 | 2/2004 | Cheung | |
| 2004/0091027 A1 | 5/2004 | Booth | |
| 2004/0146029 A1 | 7/2004 | Tong et al. | |
| 2004/0151198 A1 | 8/2004 | Brown et al. | |
| 2005/0030808 A1 | 2/2005 | Brown et al. | |
| 2005/0129052 A1 | 6/2005 | Hurwitz et al. | |
| 2005/0163120 A1 | 7/2005 | Tachibana | |
| 2005/0216942 A1 | 9/2005 | Barton | |
| 2005/0254645 A1 | 11/2005 | Shippy et al. | |

OTHER PUBLICATIONS

IEEE, "IEEE Standard for High Performance Serial Bus—Amendment 3", IEEE, Draft 0.3, Apr. 27, 2004, p. 1397c-200x.

National Semiconductor, "An Introduction to Auto-Negotiation", Bill Bunch, Feb. 1995, Converted to HTML and edited by Donald Becker, Apr. 1995, 17 pages.

* cited by examiner

| Priority | Technology |
|---|---|
| 1 | IEEE Std. 802.3 |
| 2 | IEEE Std. 802.5 |
| 3 | IEEE Std. 802.9 |
| 4 | IEEE Std. 1394 |

FIG. 3

| Selector Field (binary) | | | | | | Technology |
|---|---|---|---|---|---|---|
| 0 | 0 | 0 | 0 | 0 | 0 | Reserved for future Auto-Negotiation development |
| 1 | 0 | 0 | 0 | 0 | 0 | IEEE Std. 802.3 |
| 0 | 1 | 0 | 0 | 0 | 0 | IEEE Std. 802.9 ISLAN-16T |
| 1 | 1 | 0 | 0 | 0 | 0 | IEEE Std. 802.5 |
| 0 | 0 | 1 | 0 | 0 | 0 | IEEE Std. 1394 |
| 0 | 0 | 0 | 1 | 1 | 1 | Reserved for future Auto-Negotiation development |

FIG. 4

APPARATUS AND METHOD FOR AUTO-NEGOTIATION IN A COMMUNICATION SYSTEM

CROSS REFERENCE TO RELATED APPLICATIONS

This application is a continuation of U.S. patent application Ser. No. 11/003,739, filed Dec. 6, 2004, now U.S. Pat. No. 7,558,280, claims the benefit of U.S. Provisional Patent Application No. 60/528,476, filed Dec. 11, 2003, each of which is incorporated herein by reference in its entirety.

BACKGROUND OF THE INVENTION

1. Field of the Invention

The present invention generally relates to communication systems, and more specifically to auto-negotiation in a communication system.

2. Background Art

High speed data links transmit data from one location to another over transmission lines. For example, an Ethernet data link is a well-known high speed data link, and IEEE Std. 802.3 defines an Ethernet standard.

Many Ethernet devices support a protocol handshake method defined by IEEE Std. 802.3 Clause 28, known generally as "auto-negotiation." Auto-negotiation allows Ethernet (802.3) devices of various capabilities to discover each other and to communicate based on a common capability. Each device advertises its own capabilities and matches to the advertised capabilities of its link partner.

Clause 28 allows communication between some devices advertising a protocol other than 802.3. For example, devices advertising IEEE Std. 802.5 capability or devices advertising IEEE Std. 802.9 capability can communicate under Clause 28.

However, Clause 28 does not allow any device to simultaneously advertise both the ability to support 802.3 and the ability to support an alternate protocol. Clause 28 requires each device to set its Selector Field to either 802.3 or an alternate protocol, but not both.

Moreover, Clause 28 specifies that auto-negotiation occurs over a particular communication link (e.g., wire pairs A and B) between the devices. No uses are provided under Clause 28 for other communication links (e.g., wire pairs C and D) between the devices.

Thus, there is a need for a method and apparatus for auto-negotiation in a communication system that allows use of a second communication link to facilitate auto-negotiation of a second type.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3 illustrates an exemplary protocol hierarchy according to an embodiment of the present invention.

FIG. 4 illustrates exemplary selector field mappings that associate selector fields with particular technologies, according to an embodiment of the present invention.

DETAILED DESCRIPTION OF THE INVENTION

Communication systems generally include multiple devices that are physically or virtually connected via communication links. A communication link can include one or more wireless connections, twisted wire pairs, coaxial cables, and/or fiber optic lines, to provide some examples. Sometimes two devices can be connected by more than one link. For example, a cable including multiple links can connect the two devices. In another example, the cable itself can be the link.

Figure 1:
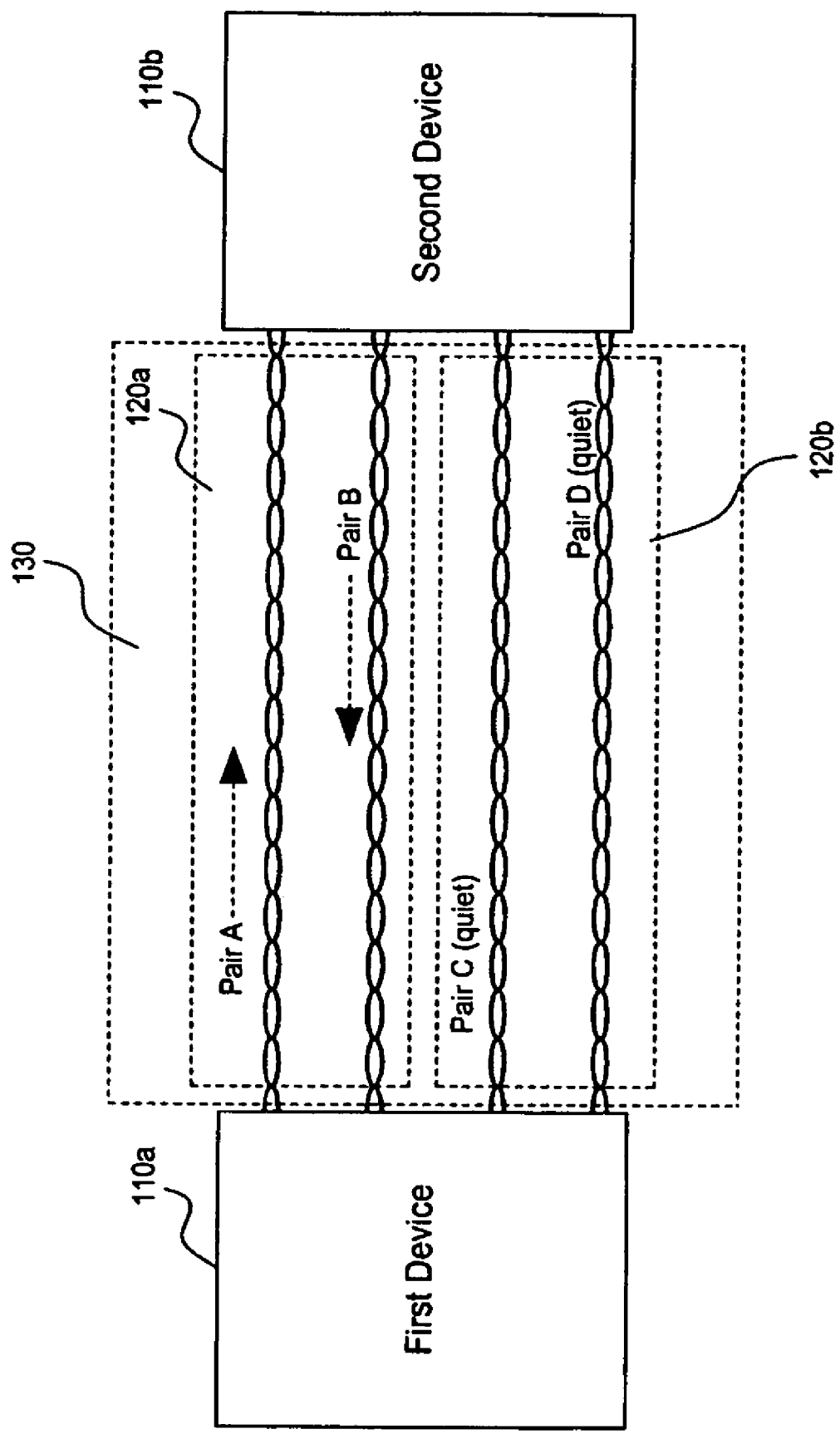
FIG. 1 illustrates IEEE Std. 802.3 Clause 28 auto-negotiation on pairs A and B of an unshielded twisted pair (UTP) cable having four wire pairs.

FIG. 1 shows a first device 110a and a second device 110b connected by two communication links 120 housed within an unshielded twisted pair (UTP) cable 130. The cable 130 can be category 3, 4, or 5 UTP cable, to provide some examples. In the embodiment of FIG. 1, each communication link 120 of the cable 130 has two twisted pairs. The first communication link 120a includes twisted pairs A and B, and the second communication link 120b includes twisted pairs C and D. The configuration shown in FIG. 1 is commonly used in Ethernet-based communication systems, though the scope of the present invention is not limited in this respect.

"S800T", also known as IEEE p1394c (e.g., p1394c-200x, draft 0.1, Nov. 16, 2003), is a high speed data link that uses a physical layer from IEEE Std. 802.3 (e.g., IEEE Std. 802.3af-2003), also known as the Ethernet standard, to carry IEEE Std. 1394 firewire data. S800T can utilize any suitable cabling standard (e.g., category 5, 5E, or 6), including any future cabling standard (e.g., category 7). S800T can utilize other transmission mediums, such as optical fiber or coaxial cable, to provide some examples. S800T is further described in U.S. Provisional Patent Appl. Nos. 60/441,769, 60/450,357, 60/464,362, and 60/484,326, all of which are incorporated herein by reference. Furthermore, the 802.3 Ethernet standard and the IEEE Std. 1394 are incorporated by reference herein in their entirety. IEEE Std. 802.3 utilizes four twisted pairs, designated as pairs A, B, C, and D in FIG. 1. According to Clause 28 of IEEE Std. 802.3, auto-negotiation between Ethernet devices occurs on pair A (wires 1 and 2) and pair B (wires 3 and 6) only. Thus, in FIG. 1, auto-negotiation between first and second devices 110 is limited to the first communication link 120a. The second communication link 120b, which includes pair C (wires 4 and 5) and pair D (wires 7 and 8), is sometimes used for data transmission after auto-negotiation is complete. For instance, 1-gigabit or 10-gigabit Ethernet can utilize pairs C and D for data transmission. However, IEEE Std. 802.3 does not specify a role for pairs C and D in auto-negotiation, as illustrated in FIG. 1. Thus, the second communication link 120b traditionally is not used under Clause 28 during auto-negotiation.

Figure 2:
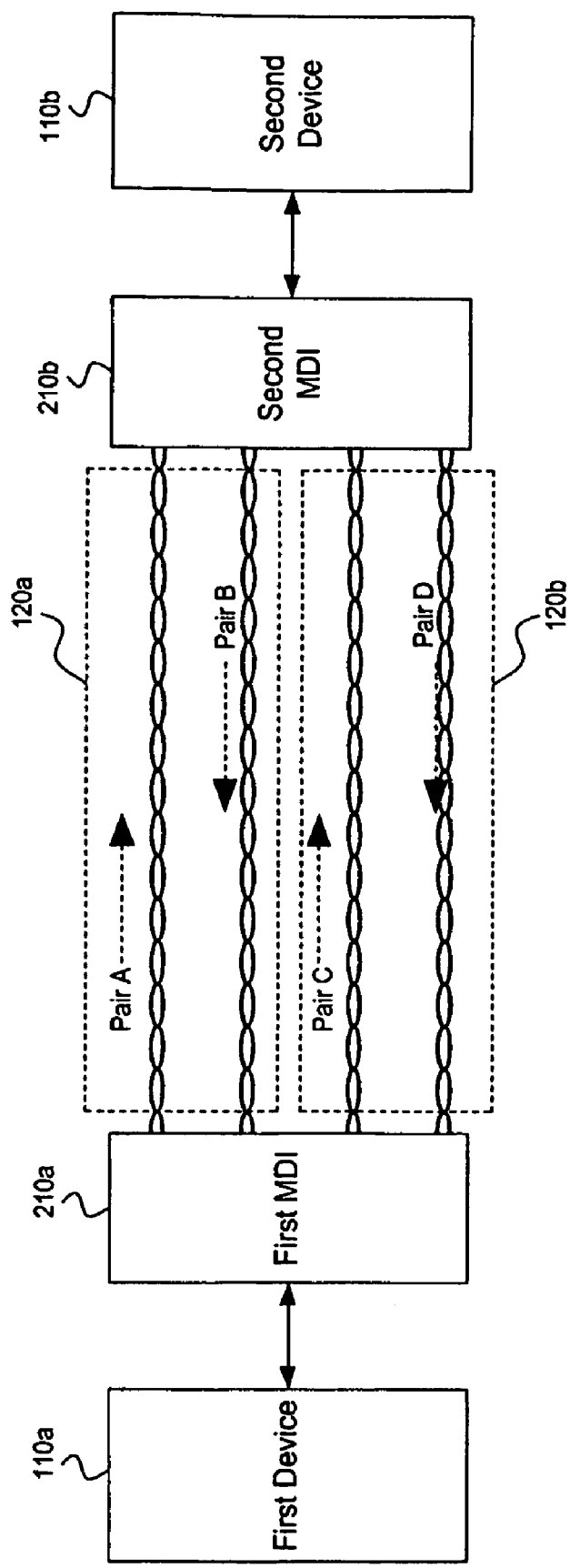
FIG. 2 illustrates using pairs C and D of the UTP cable to facilitate an IEEE Std. 1394 auto-negotiation, according to embodiments of the present invention.

Referring to FIG. 2, the second communication link 120b can be used to facilitate a second auto-negotiation. According to an embodiment, the second communication can be used to perform an auto-negotiation of a type that is different than an auto-negotiation that is performed on the first communication link 120a. For instance, if an IEEE Std. 802.3 auto-negotiation is performed using pairs A and B, an IEEE Std. 1394 auto-negotiation can be performed using pairs C and D. In an embodiment, the second auto-negotiation occurs in parallel with the first auto-negotiation. For instance, a device 110 can simultaneously perform an IEEE Std. 1394 auto-negotiation on pairs C and D and an IEEE Std. 802.3 auto-negotiation on pairs A and B.

The first and second devices 110 are capable of advertising their abilities with respect to multiple technologies. In this example, pairs A and B are used to advertise capabilities for 802.3 operation, and pairs C and D are used to advertise capabilities for the IEEE Std. 1394 protocol. Each device 110 can perform the first and second auto-negotiations in parallel over the first and second communication links 120. Devices 110 that are capable of supporting different and/or multiple technologies can transfer information over the same cable 130, for example. The first and second auto-negotiations can be performed using 10-gigabit Ethernet. For instance, the first and second auto-negotiations can be performed on the same type of twisted pair cable.

The second communication link 120b can provide signal information outside of the auto-negotiation protocol. According to an embodiment, the signal information can include instructions to change the advertised protocol on the first communication link 120a or the second communication link 120b.

For example, if the IEEE Std. 802.3 protocol is advertised on pairs A and B (i.e. on the first communication link 120a), the signal information can include instructions to stop the 802.3 auto-negotiation on the first communication link 120a, change the advertised protocol to be some other protocol (e.g., the IEEE Std. 1394 protocol), and restart auto-negotiation on pairs A and B using the 1394 protocol, rather than the 802.3 protocol.

In another example, if the IEEE Std. 1394 protocol is advertised on the second communication link 120b, the signal information can include instructions to stop the 1394 auto-negotiation on the second communication link 120b, change the advertised protocol to be some other protocol (e.g., the IEEE Std. 802.3 protocol), and restart auto-negotiation on pairs C and D using the 802.3 protocol, rather than the 1394 protocol.

A media dependent interface (MDI) 210 generally interfaces between a device 110 and one or more communication links 120. As shown in FIG. 2, the first MDI 210a interfaces between the first device 110a and the first and second communication links 120. The second MDI 210b interfaces between the second device 110b and the first and second communication links 120. For example, the first MDI 210a or the second MDI 210b can be a registered jack-45 (RJ-45) connector. In an embodiment, all eight pinouts of the RJ-45 connector are used during an auto-negotiation operation between the first and second devices 110.

The protocol to be used for data transmission between the first and second devices 110, for example, depends on at least one of the advertised protocols of the first device 110a matching an advertised protocol of the second device 110b. Referring to FIG. 2, data transmission between the first and second devices 110 depends on both the first and second devices 110 advertising at least one of the 802.3 and 1394 standards.

In FIG. 2, if both the first and second devices 110 advertise 802.3 capability, then the first communication link 120a produces a match. If both the first and second devices 110 advertise 1394 capability, then the second communication link 120b produces a match.

If only one communication link 120 produces a match, then that match defines the protocol to be used for data transmission between the first and second devices 110. This can be particularly useful when the first or second device 110 is a legacy device (i.e. a device having 802.3 capability) that does not recognize an alternate protocol, such as the IEEE 1394 protocol. Traditional legacy devices generally ignore signals on pairs C and D. Thus, embodiments of the present invention are compatible with existing 802.3 legacy devices.

Referring to FIG. 2, if only the first communication link 120a produces a match, then the 802.3 standard is used for communication between the first and second devices 110. If only the second communication link 120b produces a match, then the 1394 standard is used. The scope of the present invention is not limited to 802.3 and 1394 technologies. For instance, the first device 110a and/or the second device 110b can advertise IEEE Std. 802.5 capability or IEEE Std. 802.9 capability, to provide some examples. Embodiments of the present invention can enable a device to advertise any suitable capability and to recognize another device having a matching capability. Devices can advertise 802.3, 802.5, 802.9, 1394, or other technologies over the same unshielded twisted pair (UTP) cable, for example. According to an embodiment, the technologies are advertised over the same 10-gigabit Ethernet. Generally, one of the first and second devices 120 advertises a first protocol on the first communication link 120a, and the other of the first and second devices 120 advertises a second protocol on the second communication link 120b.

If both communication links 120 produce a match, then the protocol to be used for data transmission between the first and second devices 110 is typically determined based on a protocol hierarchy, such as the exemplary protocol hierarchy 300 shown in FIG. 3. The protocol hierarchy 300 is often predetermined and can be stored in a memory of the first device 110a or the second device 100b, for example. The protocol hierarchy can have any suitable combination of technologies, and each technology can have any suitable priority.

The protocol hierarchy can be a hybrid hierarchy, in which one or more Ethernet technologies and one or more 1394c technologies are intermingled. For example, a first Ethernet technology can have a higher priority than a 1394c technology, which can have a higher priority than a second Ethernet technology. In another example, a first 1394c technology can have a higher priority than an Ethernet technology, which can have a higher priority than a second 1394c technology.

Each technology shown in FIG. 3 is associated with a separate priority. However, multiple technologies can share the same priority. Priorities are listed from the highest priority of "1" to the lowest priority of "4", though the protocol hierarchy 300 can include any suitable number of priorities. In FIG. 3, IEEE Std. 802.3 has the highest priority, and IEEE Std. 1394 has the lowest priority.

For example, if both the first and second devices 110 advertise IEEE Std. 802.3 on the first communication link 120a and IEEE Std. 1394 on the second communication link 120b, then the first and second communication links 120 each produce a match. Referring to the protocol hierarchy 300 of FIG. 3, the IEEE Std. 802.3 protocol has a higher priority than the IEEE Std. 1394 protocol. The IEEE Std. 802.3 protocol is, therefore, the protocol to be used for data transmission between the first and second devices 110. According to an embodiment, a selector field can be associated with each device 110 to indicate the protocol to be advertised by the device 110. FIG. 4 illustrates exemplary selector field mappings that associate selector fields 410 with particular technologies 420. The selector fields 410 shown in FIG. 4 have five bits each, though other bit lengths can be used. Referring to FIG. 4, selector field $(00001)_2$ is associated with IEEE Std. 802.3. Selector field $(00010)_2$ is associated with IEEE Std. 802.9 ISLAN-16T. Selector field $(00011)_2$ is associated with IEEE Std.

802.5. Selector field $(00100)_2$ is associated with IEEE Std. 1394. Other selector field descriptions can be used.

A device 110 that is capable of supporting more than one technology can be associated with more than one selector field 410. For example, if the first device 110a has an IEEE Std. 802.5 capability and an IEEE Std. 802.9 ISLAN-16T capability, the selector fields 410 corresponding to these technologies can each be associated with the first device 110a. Referring to the selector field value mappings 400 shown in FIG. 4, the selector fields 410 corresponding to IEEE Std. 802.5 and IEEE Std. 802.9 technologies are $(00011)_2$ and (00010)2, respectively. In this example, the first device 110a is associated with the $(00011)_2$ and $(00010)_2$ selector fields 410.

A device 110 generally advertises a particular capability by transmitting the selector field 410 corresponding to that capability in an encoded stream of data. For example, in a communication system having twisted pairs as shown in FIG. 1 and FIG. 2, the selector field 410 can be transmitted using a series of pulses (i.e. a fast link pulse (FLP) burst) that encode a 16-bit word, commonly referred to as the link code word (LCW). Selector fields 410 can be transmitted in communication systems having other types of communication links (e.g., wireless connections, coaxial cables, or fiber optic lines) by using other types of encoding schemes.

If a device 110 is capable of supporting multiple technologies, then a first link code word having a first selector field value may be transmitted with a second link code word having a second selector field value using some type of interleaving. According to an embodiment, the first selector field value can be used to advertise 802.3 operation on the first communication link 120a, and the second selector field value can be used to advertise 1394, or another alternate technology, on the second communication link 120b. In an embodiment, the capabilities indicated by the first selector field value and the second selector field value can be advertised simultaneously.

According to an embodiment, if a device 110 is capable of supporting multiple technologies, then the device 110 can transmit the selector fields 410 corresponding to those technologies in separate LCWs. For example, the first capability can be transmitted in a first LCW, and the second capability can be transmitted in a second LCW, etc. In accordance with an embodiment of the present invention, transmitting only one selector field value 410 can improve compatibility between legacy and non-legacy devices.

Figure 5:
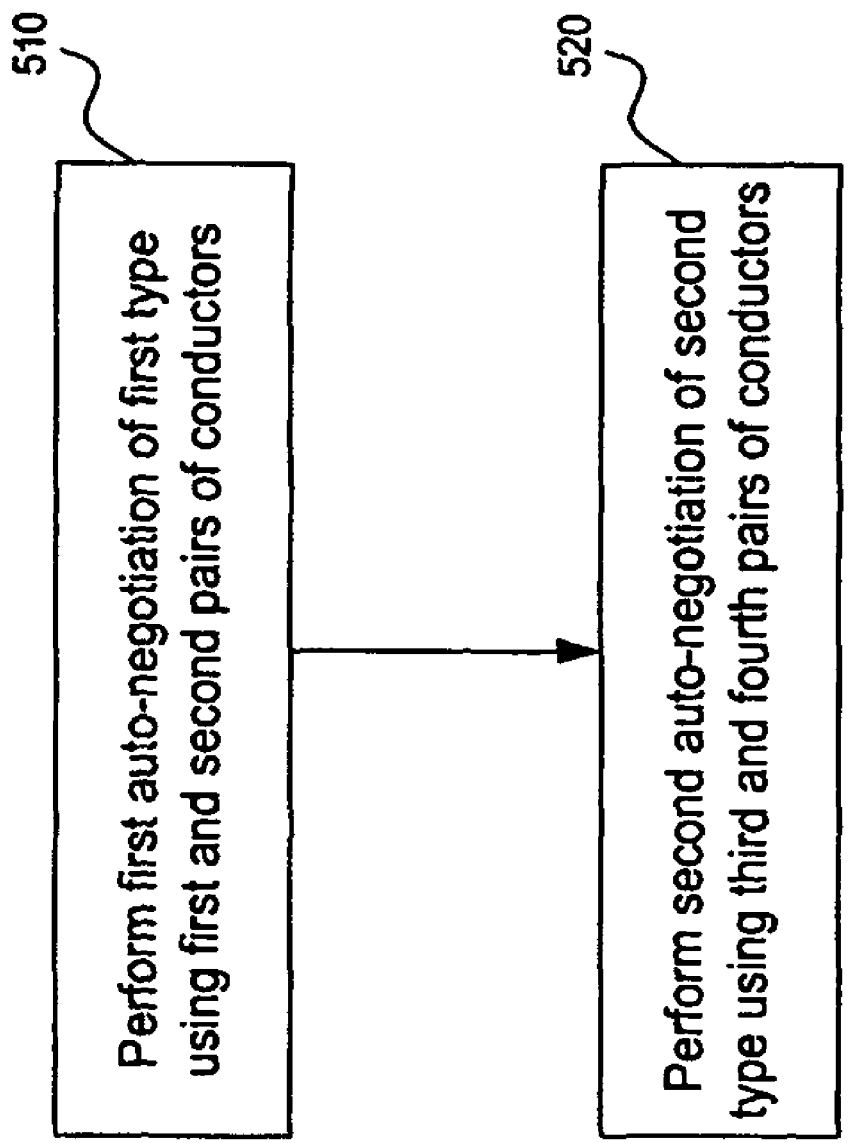
FIG. 5 illustrates a flow chart of a first method according to an embodiment of the present invention.

Referring to FIG. 5, a first auto-negotiation of a first type is performed at block 510 using first and second pairs of conductors. A second auto-negotiation of a second type is performed at block 520 using third and fourth pairs of conductors. For example, the first, second, third and fourth pairs of conductors can be pairs A, B, C, and D of an IEEE Std. 802.3 four twisted pair cable.

The first and second auto-negotiations can be performed in parallel, rather than in series. Performing the auto-negotiations in parallel can reduce the time required to perform the auto-negotiations. For instance, the first auto-negotiation can require $t_1$ seconds, and the second auto-negotiation can require $t_2$ seconds. If the auto-negotiations are performed in series, the total time required to perform the auto-negotiations is $t_1+t_2$ seconds. If the auto-negotiations are performed in parallel, the total time required to perform the auto-negotiations is $t_1$ or $t_2$ seconds, whichever is greater.

Figure 6:
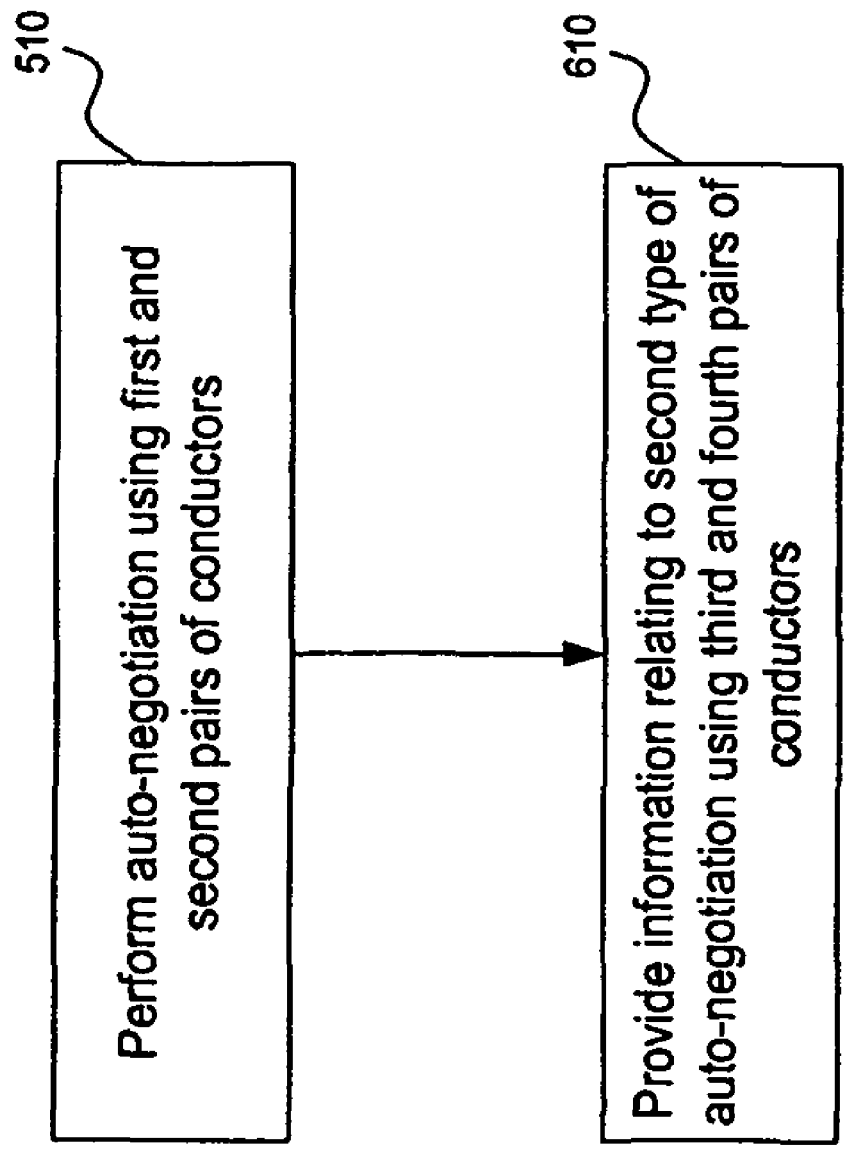
FIG. 6 illustrates a flow chart of a second method according to an embodiment of the present invention.

In FIG. 6, information relating to a second type of auto-negotiation is provided at block 610 using the third and fourth pairs of conductors. Based on the information, the first type of auto-negotiation can be stopped, the advertised protocol in a selector field can be changed, and the second type of auto-negotiation can be started. For instance, changing the advertised protocol can include replacing a protocol associated with the first type of auto-negotiation with a protocol associated with the second type of auto-negotiation.

Figure 7:
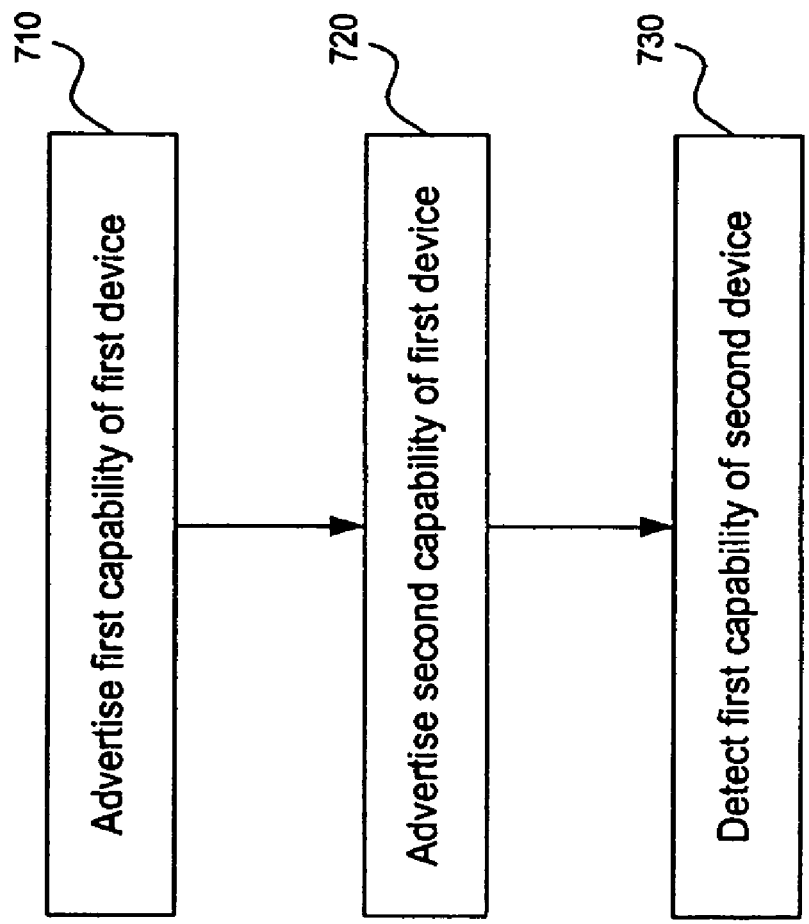
FIG. 7 illustrates a flow chart of a third method according to an embodiment of the present invention.

Referring to FIG. 7, a first capability of a first device is advertised at block 710. A second capability of the first device is advertised at block 720. For example, the first device can advertise a capability to support an IEEE Std. 802.3 protocol and a capability to support an IEEE Std. 1394 protocol. According to an embodiment, advertising the first and second capabilities is performed in parallel. The first capability of a second device is detected at block 730. For example, if the first capability is an ability to communicate using the IEEE Std. 802.5 standard and the first and second devices both have this capability, then the 802.5 protocol can be used for data transmission between the first and second devices.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. An apparatus for performing auto-negotiation in a communications system, comprising:
   a first device configured to advertise a first capability to operate in accordance with a first communications protocol and to advertise a second capability to operate in accordance with a second communications protocol,
   wherein the first device is configured to perform a first auto-negotiation of the first communications protocol with a second device when the first capability matches a capability of the second device and to perform a second auto-negotiation of the second communications protocol with the second device when the second capability matches the capability of the second device, and
   wherein the first device is further configured to use a protocol hierarchy to determine whether to perform the first auto-negotiation or the second auto-negotiation when both the first capability and the second capability match the capability of the second device.

2. The apparatus of claim 1, wherein the first device is configured to simultaneously advertise the first capability and the second capability.

3. The apparatus of claim 1, wherein the first communications protocol is an Institute of Electrical and Electronics Engineers (IEEE) Standard 802.3 communications protocol, and the second communications protocol is an IEEE Standard 1394 communications protocol.

4. The apparatus of claim 1, wherein the first communications protocol is an Institute of Electrical and Electronics Engineers (IEEE) Standard 802.3 communications protocol, and the second communications protocol is a non-IEEE Standard 802.3 communications protocol.

5. The apparatus of claim 1, wherein the first device is configured to advertise the first capability over a first communication link and to advertise the second capability over a second communication link.

6. The apparatus of claim 5, wherein the first communication link and the second communication link each include at least two pairs of conductors.

7. The apparatus of claim 1, wherein the second device is configured to advertise at least one of a group consisting of:
the first capability for operation in accordance with the first communications protocol, and
the second capability for operation in accordance with the second communications protocol.

8. The apparatus of claim 1, wherein the first communications protocol is assigned a higher priority than the second communication protocol such that the first device is configured to perform the first auto-negotiation when the first capability matches the capability of the second device and the second capability matches the capability of the second device.

9. The apparatus of claim 1, wherein the first communications protocol is an Institute of Electrical and Electronics Engineers (IEEE) Standard 802.3 communications protocol, and the second communications protocol is an IEEE Standard 1394 communications protocol, the IEEE Standard 802.3 communications protocol being assigned a higher priority than the IEEE Standard 1394 communications protocol such that the first device is configured to perform an auto-negotiation of the IEEE Standard 802.3 communications protocol when the first capability matches the capability of the second device and the second capability matches the capability of the second device.

10. The apparatus of claim 1, wherein the first communications protocol is an Institute of Electrical and Electronics Engineers (IEEE) Standard 802.3 communications protocol, and the second communications protocol is a non-IEEE Standard 802.3 communications protocol, the IEEE Standard 802.3 communications protocol being assigned a higher priority than the non-IEEE Standard 802.3 communications protocol such that the first device is configured to perform an auto-negotiation of the IEEE Standard 802.3 communications protocol when the first capability matches the capability of the second device and the second capability matches the capability of the second device.

11. The apparatus of claim 1, wherein the first device is configured to transmit a first link code word having a first selector field to advertise the first capability and a second link code word having a second selector field to advertise the second capability.

12. The apparatus of claim 11, wherein the first device is configured to simultaneously transmit the first link code word and the second link code word.

13. A method of performing auto-negotiation in a communication system, comprising:
(a) advertising, by a first device to a second device, a first capability to operate in accordance with a first communications protocol;
(b) advertising, by the first device to the second device, a second capability to operate in accordance with a second communications protocol; and
(c) performing, by the first device, a first auto-negotiation of the first communications protocol with the second device when the first capability matches a capability of the second device or a second auto-negotiation of the second communications protocol with the second device when the first capability matches the capability of the second device, wherein step (c) comprises:
(c)(i) using a protocol hierarchy to determine whether to perform the first auto-negotiation or the second auto-negotiation when the first capability matches the capability of the second device and the second capability matches the capability of the second device.

14. The method of claim 13, wherein step (b) comprises:
(b)(i) simultaneously advertising the first capability and the second capability.

15. The method of claim 13, wherein step (a) comprises:
(a)(i) using the first device to advertise the first capability to operate in accordance with an Institute of Electrical and Electronics Engineers (IEEE) Standard 802.3 communications protocol, and wherein step (b) comprises:
(b) using the first device to advertise the second capability to operate in accordance with an IEEE Standard 1394 communications protocol.

16. The method of claim 13, wherein step (a) comprises:
(a)(i) using the first device to advertise the first capability to operate in accordance with an Institute of Electrical and Electronics Engineers (IEEE) Standard 802.3 communications protocol, and wherein step (b) comprises:
(b) using the first device to advertise the second capability to operate in accordance with a non-IEEE Standard 802.3 communications protocol.

17. The method of claim 13, wherein step (a) comprises:
(a)(i) using the first device to advertise the first capability over a first communication link, and wherein step (b) comprises:
(b) using the first device to advertise the second capability over a second communication link.

18. The method of claim 13, further comprising:
(d) using the second device to advertise at least one of a group consisting of:
the first capability, and
the second capability.

19. The method of claim 13, wherein step (c)(i) comprises:
(c)(i)(A) assigning the first communications protocol to a higher priority than the second communication protocol; and
(c)(i)(B) performing the first auto-negotiation when the first capability matches the capability of the second device and the second capability matches the capability of the second device.

20. The method of claim 13, wherein the first communications protocol is an Institute of Electrical and Electronics Engineers (IEEE) Standard 802.3 communications protocol and the second communications protocol is an IEEE Standard 1394 communications protocol, and wherein step (c)(i) comprises:
(c)(i)(A) assigning the IEEE Standard 802.3 communications protocol to a higher priority than the IEEE Standard 1394 communications protocol; and
(c)(i)(B) performing an auto-negotiation of the IEEE Standard 802.3 communications protocol when the first capability matches the capability of the second device and the second capability matches the capability of the second device.

21. The method of claim 13, wherein the first communications protocol is an Institute of Electrical and Electronics Engineers (IEEE) Standard 802.3 communications protocol, and the second communications protocol is a non-IEEE Standard 802.3 communications protocol, and wherein step (c)(i) comprises:
(c)(i)(A) assigning the IEEE Standard 802.3 communications protocol to a higher priority than the non-IEEE Standard 802.3 communications protocol; and
(c)(i)(B) performing an auto-negotiation of the IEEE Standard 802.3 communications protocol when the first capability matches the capability of the second device and the second capability matches the capability of the second device.

22. The method of claim 13, wherein step (a) comprises:
(a)(i) using the first device to transmit a first link code word having a first selector field to advertise the first capability, and wherein step (b) comprises:

(b)(i) using the first device to transmit a second link code word having a second selector field selector field to advertise the second capability.

23. The method of claim 22, wherein step (b)(i) comprises:
(b)(i)(A) simultaneously transmitting the first link code word and the second link code word.

\* \* \* \* \*

UNITED STATES PATENT AND TRADEMARK OFFICE
CERTIFICATE OF CORRECTION

| | | |
|---|---|---|
| PATENT NO. | : 7,894,464 B2 | Page 1 of 1 |
| APPLICATION NO. | : 12/457093 | |
| DATED | : February 22, 2011 | |
| INVENTOR(S) | : Hurwitz et al. | |

It is certified that error appears in the above-identified patent and that said Letters Patent is hereby corrected as shown below:

At Title Page, item (75), Inventors, "Richard Thousand" should be replaced with --Richard G. Thousand--.

Signed and Sealed this

Thirty-first Day of May, 2011

David J. Kappos
*Director of the United States Patent and Trademark Office*